Patented Mar. 21, 1950

2,501,132

UNITED STATES PATENT OFFICE 2,501,132

AMINO-THIOPHANTHRAQUINONES

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,672

4 Claims. (Cl. 260—329)

This invention relates to new thiophanthraquinones, and more particularly to the preparation of amino-substituted thiophanthraquinones of the formula:

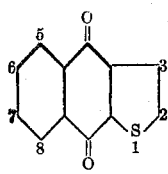

wherein any one of the positions 5, 6, 7 and 8 carry an amino group, while the remaining positions are unsubstituted.

The term "thiophanthraquinone" is employed in the naming of this compound in view of the original name used by Scholl and Seer in Ann. 394, 131 (1912), who designated the corresponding unsubstituted hydrocarbon compound "thiophanthracene."

It is an object of this invention to prepare new amino-thiophanthraquinones which are useful as starting materials for the preparation of other compounds, and particularly as intermediates for the synthesis of dyes. A further object of the invention is to provide a commercially feasible process for the preparation of these new amino-thiophanthraquinones.

The amino-thiophanthraquinones of this invention may be produced by reducing the corresponding nitro-(2-thenoyl)-o-benzoic acids more particularly disclosed in co-pending application Serial No. 723,670, and then effecting ring closure of the thenoyl-o-benzoic acid group, or they may be produced by reducing the nitro-thiophanthraquinones more particularly described in co-pending application Serial No. 723,671 either after they have been isolated, or without isolation from the ring closure mass in which they have been formed. The nitro-(2-thenoyl)-o-benzoic acids, as disclosed in the co-pending application above mentioned, may be prepared by reacting the nitro-substituted phthalic anhydrides with the Grignard reagent prepared from 2-bromothiophene or 2-iodothiophene, or by condensation of the corresponding nitrophthalic anhydride with thiophene by the aid of aluminum chloride or similar condensing agent. These nitro-(2-thenoyl)-o-benzoic acids may then be reduced to the corresponding amino derivatives, as hereinafter described.

The following examples are given to illustrate the invention. The parts used are by weight.

Example 1

Fifty (50) parts of ferrous sulfate were dissolved in 330 parts of water and the solution was heated to about 95° C. Eighty (80) parts of 28% ammonia were added while the charge was held at slightly boiling. Five (5) parts of 6-nitro-(2-thenoyl)-o-benzoic acid, melting range 216°–217° C., of the formula:

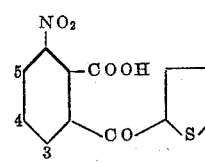

were dissolved in 50 parts of 28% ammonia, and this solution was added in 15 minutes to the boiling slurry of ferrous hydroxide prepared as above. The reaction mass was kept at slightly boiling for 15 minutes longer, and then filtered while still hot. The filtrate, which soon deposited dark-colored material although originally clear and light-colored, was evaporated to dryness without any further clarification. Twenty-five (25) parts of a mixture of 6-amino-(2-thenoyl)-o-benzoic acid and inorganic salts were obtained. This crude product and 10 parts of boric acid were dissolved in 90 parts of 95% sulfuric acid. The dull brown solution was heated at 135° C. for 3 minutes, when it changed to a deep red. It was then cooled and poured onto 500 parts of ice. The red precipitate was filtered off, washed acid-free, then washed with a dilute solution of sodium carbonate, again washed with water and dried. 2.6 parts of crude 5-amino-thiophanthraquinone, melting range 220°–222° C., were obtained, equal to a yield of 62.8% based on 6-nitro-(2-thenoyl)-o-benzoic acid. After several crystallizations from about 35 parts of chlorobenzene per part of crude product, it was obtained in the form of dark red crystals melting at 231°–232° C. It was soluble in sulfuric acid with a faint yellow color which turned purple upon the addition of a trace of formaldehyde. The maximum light absorption of an acetone solution of 5-amino-thiophanthraquinone was at a wave length of 491 millimicrons. The maximum light absorption of an alpha-aminoanthraquinone was at 469 millimicrons.

Example 2

Ten (10) parts of 6-nitro-(2-thenoyl)-o-benzoic acid, melting range 216°–217° C., were dissolved in 300 parts of water containing 6 parts of sodium hydroxide, and 25 parts of sodium hydrosulfite were then added at 25° C. The temperature rose spontaneously to 45° C., the solution turned deep red, and finally light orange. The excess of sodium hydrosulfite was destroyed by adding m-nitrobenzene sodium sulfonate. The solution was clarified by filtering it over absorbent carbon, and evaporated to dryness. Fifty (50) parts of crude product containing 6-amino-(2-thenoyl)-o-benzoic acid were obtained.

This crude product was dissolved in 225 parts of 95% sulfuric containing 25 parts of boric acid and the solution was heated to 125° C. for a few minutes. It was then poured onto about 800 parts of ice. The red precipitate was filtered off, washed acid-free with water, then washed with dilute sodium carbonate and again washed with water and dried. 3.15 parts of crude 5-amino-thiophanthraquinone were obtained.

Five (5) parts of this crude 5-amino-thiophanthraquinone were dissolved in 2500 parts of chlorobenzene. The solution was passed through a column containing alumina, activated by heating at 325° to 350° C. A purple colored band collected near the top of the column. The main product formed a bright red band which was separated and Soxhlet extracted with ethanol. Upon evaporation of the extract 4.9 parts of 5-amino-thiophanthraquinone were obtained, melting at 228°–230° C. After two crystallizations from 35 parts of chlorobenzene per part of product, 3 parts of pure 5-amino-thiophanthraquinone melting at 231°–232° C. were obtained.

*Example 3*

One hundred (100) parts of ferrous sulfate were dissolved in 660 parts of water and 160 parts of 28% ammonia were added at from 85° to 90° C. A solution of 10 parts of 3-nitro-(2-thenoyl)-o-benzoic acid, melting range 169°–170° C., in 100 parts of 28% ammonia was added to the above slurry of ferrous hydroxide at 85° to 95° C. in about 15 minutes. The reaction mass was gently boiled for 15 minutes and filtered while still hot. The filtrate was evaporated to dryness and 56 parts of product containing 3-amino-(2-thenoyl)-o-benzoic acid were obtained.

Thirty-seven (37) parts of this crude product and 16 parts of boric acid were dissolved in 145 parts of 95% sulfuric acid and the solution was heated at 95° to 105° C. for 2½ hours. A reddish blue solution was formed. The 5-amino-thiophanthraquinone was precipitated by slowly adding water to the sulfuric acid solution while keeping the temperature below 80° C. After 100 parts of water had been added, the sulfate of the 5-amino-thiophanthraquinone crystallized out. The charge was then diluted with a total of 1500 parts of water. The red precipitate was filtered off, washed and dried.

3.6 parts of crude 5-amino-thiophanthraquinone melting at 225° C. were obtained, equal to a yield of 60% of theory, based on 3-nitro-(2-thenoyl)-o-benzoic acid. The crude product was purified by separating it from impurities on a column of activated alumina as described in Example 2. The purified product thus obtained was crystallized from 21 parts of chlorobenzene and melted at 232°–233° C. It was soluble in sulfuric acid with a faint yellow color which turned purple upon the addition of a trace of formaldehyde. The maximum light absorption of an acetone solution was at a wave length of 491 millimicrons.

*Example 4*

Eight (8) parts of 3-nitro-(2-thenoyl)-o-benzoic acid, melting range 169°–170° C., were added at about 25° C. to a solution of 23 parts of aluminum chloride in 120 parts of nitrobenzene. The temperature was raised slowly to 125° C. in three hours and the charge was agitated at 125° to 130° C. for 20 hours. It was then poured into dilute hydrochloric acid and steam distilled to remove the nitrobenzene. The residue was filtered off, washed and heated in about 5 parts of pyridine to break up some hard lumps. This crude 8-nitro-thiophanthraquinone was then reduced and vatted at about 70° C. in a solution of 10 parts of sodium hydroxide and 30 parts of sodium hydrosulfite in 400 parts of water. The orange-colored vat was filtered, and the crude 8-amino-thiophanthraquinone was precipitated by blowing air through the solution, filtered off, washed and dried.

The crude product thus obtained was purified by dissolving in chlorobenzene and separating the impurities on activated alumina as described in preceding examples. Upon crystallization from chlorobenzene, 8-amino-thiophanthraquinone melting from 232°–233° C. was obtained.

*Example 5*

Five (5) parts of 5-nitro-(2-thenoyl)-o-benzoic acid, melting range 149°–150° C., were dissolved in a solution of 14 parts of anhydrous aluminum chloride in 80 parts of nitrobenzene, and the solution was heated at 125° to 130° C. for about 20 hours. The reaction mass was poured into dilute hydrochloric acid and steam distilled to remove the nitrobenzene. The residue was filtered off, washed acid-free, slurried in warm dilute sodium carbonate, and filtered again.

This crude 6-nitro-thiophanthraquinone, without having been dried, was heated in 10 parts of pyridine to break up some hard lumps. It was then poured into a solution of 4 parts of sodium hydroxide and 15 parts of sodium hydrosulfite and heated to about 70° C. The orange-colored vat was blown with air, and the 6-amino-thiophanthraquinone was precipitated, filtered off, washed and dried.

2.3 parts of crude 6-amino-thiophanthraquinone, melting from 265° to 267° C., were obtained, equal to a yield of 55.7%, based on 5-nitro-(2-thenoyl)-o-benzoic acid. It was dissolved in 2000 parts of chlorobenzene and purified on activated alumina as previously described. The product thus obtained was further purified by crystallizing it from 50 parts of o-dichlorobenzene per part of product.

6-amino-thiophanthraquinone melting at 270°–271° C. was obtained. It was soluble in sulfuric acid with a faint yellow color, and the addition of traces of formaldehyde caused no color formation. The maximum light absorption of its acetone solution was at a wave length of 465 millimicrons. The maximum light absorption of a beta-amino-anthraquinone was at 434 millimicrons.

*Example 6*

Ten (10) parts of 4-nitro-(2-thenoyl)-o-benzoic acid, melting range 189°–190° C., were added at about 25° C. to a solution of 28 parts of anhydrous aluminum chloride in 160 parts of nitrobenzene. The solution was heated at 125° to 130° C. for 20 hours. The crude nitro-thiophanthraquinone was isolated and reduced as described in the preceding example for 6-nitro-thiophanthraquinone. Four (4) parts of crude amino-thiophanthraquinone melting at 260° C. were obtained, equal to 48.7% of theory. It was dissolved in 3600 parts of chlorobenzene and purified on a column of alumina as described in the preceding examples. After several crystallizations from 90 parts of o-dichlorobenzene per part of crude product, amino-thiophanthraquinone melting at 269°–270° C. was obtained. It dissolved in sulfuric acid with a faint yellow color which did not change when traces of formaldehyde were added. The maximum light absorption of its acetone solution was at 465 millimicrons. The product produced by the example is a mixture of 6-amino-thiophanthraquinone and 7-amino-thiophanthraquinone.

*Example 7*

A solution of 3.5 parts of 4-nitro-(2-thenoyl)-o-benzoic acid, melting range 189°–190° C., and 1.5 parts of boric acid in 35 parts 96% sulfuric acid was heated at 125° to 135° C. for about 30 minutes, and was then poured on ice. The crude nitro-thiophanthraquinone which precipitated was filtered and washed acid-free. It was reduced and vatted by heating it to about 70° C. in a solution of 4 parts of sodium hydroxide and 15 parts of sodium hydrosulfite in 100 parts of water. The crude amino-thiophanthraquinone was precipitated by adding m-nitrobenzene sodium sulfonate to the vat, filtered, washed and dried.

0.85 part of a mixture of 6- and 7-amino-thiophanthraquinones, melting at from 269°–270° C., was obtained.

As illustrated in the above examples, the nitro-thiophanthraquinones can be reduced to the amino-thiophanthraquinones in the condensation mass in which they are formed without isolation or purification. So, also, the nitro-(2-thenoyl)-o-benzoic acids may be reduced and ring closed without isolation in pure form, or by separation from the organic salts which are produced in the reduction. Various modifications may of course be made in the reduction and ring closure steps, since the above examples are given merely to illustrate the invention, and not as limitations thereon.

We claim:

1. The mono-amino-thiophanthraquinones of the formula:

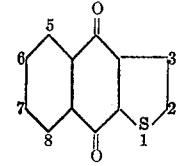

in which the $NH_2$ group is in one of the positions 5, 6, 7, and 8 while the remaining positions are substituted with hydrogen.

2. 5-amino-thiophanthraquinone.
3. 6-amino-thiophanthraquinone.
4. 8-amino-thiophanthraquinone.

HENRY R. LEE.
VIKTOR WEINMAYR.

REFERENCES CITED

The following references are of record in the file of this patent:

Steinkopf: Ann. 407, 99, 107, 108 (1944).
Thomas: "Anhydrous Aluminum Chloride," pages 512, 540, Reinhold Pub. Co., 1941.
Groggins: "Unit Process in Organic Synthesis," page 188, Edition 2, 1938, McGraw-Hill, N. Y.
Groggins: Ind. Eng. Chem., April 1929, vol. 21, pages 1 and 2.